L. GOLDMERSTEIN.
BRAKE LOCK FOR AUTOMOBILES.
APPLICATION FILED MAR. 25, 1916.
1,210,640.
Patented Jan. 2, 1917.
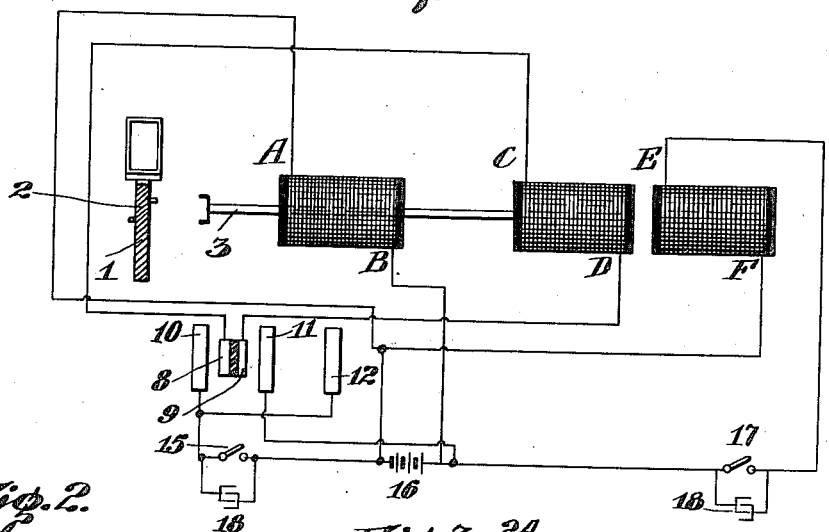
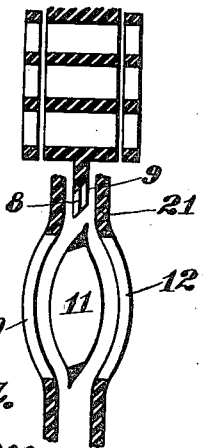
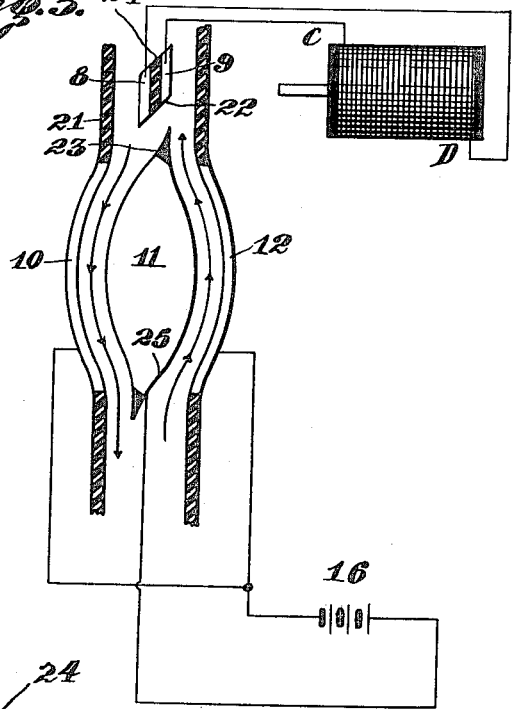
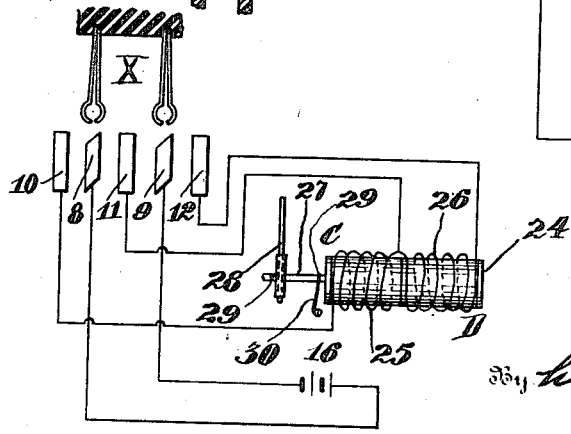
Inventor
Leon Goldmerstein
By his Attorney

UNITED STATES PATENT OFFICE.

LEON GOLDMERSTEIN, OF NEW YORK, N. Y.

BRAKE-LOCK FOR AUTOMOBILES.

1,210,640.  Specification of Letters Patent.  Patented Jan. 2, 1917.

Application filed March 25, 1916. Serial No. 86,695.

*To all whom it may concern:*

Be it known that I, LEON GOLDMERSTEIN, a subject of the Czar of Russia, and resident of the borough of Manhattan, in the city, county, and State of New York, have invented certain new and useful Improvements in Brake-Locks for Automobiles, of which the following is a specification.

This invention relates to electrically operated means for locking the brakes of automobiles, its purpose being in the main to secure the brakes, when set; to remove the liability of a car rolling away when left standing on a grade, and to prevent tampering with the brakes in the absence of the operator.

The present improvement comprises a modification of the device described in my patent application filed December 8, 1915, Serial No. 65858, and it comprehends the employment of a novel form of commutator, whereby the operation of the locking device is rendered absolutely uniform and certain.

The structural feature comprised in the present application, in lieu of the corresponding feature in said former application, involves the arrangement whereby the movements of the master switch in each opposite direction—wherein said movements have the respective functions of closing certain distributing circuits for operative purposes, and of opening the same circuits for periods of inactivity of the parts affected— each may act in causing the brake locking member to be moved into engagement with the brake, or to be moved out of such engagement. The presumption in said former application device is that when the master switch is opened, i. e. the spark and other devices made inoperative, the brake should be locked, and when the master switch is closed, the brake should be released. If however, in some way the brake locking member should become jammed, and the movement of closing the switch fail to release it, then it may happen that the brake will be released on the next or opening movement of the switch, when actually the brake should be locked in that action.

Hence, the essential element of the present improvement consists in the inclusion of the commutator device in the master switch itself, the construction of said commutator being such that whenever the master switch is closed, the effort is to release the brake, and whenever the master switch is opened, the effort is to lock the brake. These distinctive functions are achieved by the inclusion of the commutator in the master switch, and the arrangement of parts therein, as will be hereinafter more fully described.

In the drawing:—Figure 1 is a general diagrammatic view of the brake locking device. Fig. 2 is a diagrammatic view of the master switch, showing the relative position of the commutator element with respect to said switch. Fig. 3 is a more detailed view of the commutator element, and Fig. 4 shows a modification.

The operative elements of the locking device are in the main the same as those described in my said former application. There are three solenoids, two, AB and EF, stationary, and the third, CD, movable (the presence of the solenoid EF is helpful, but not indispensable). Solenoids AB and EF are connected in such a manner that B and F are of the same polarity. The solenoid CD carries a rod 3 which may engage in a slot, or the like, 2, of the brake rod 1. If now, with all the elements in the position shown in Fig. 1, the switches 15 and 17 be closed simultaneously, all the three solenoids will be magnetically energized. The solenoid CD will be energized through a current flowing from battery 16 through switch 15, and a commutating device shown in Fig. 1 as 10, 8, 9, 11, in which 8 and 9 are conductors, and the sectioned part between them an insulator. With the connection as shown, the solenoid CD will be energized in such a manner that it will be attracted by B and repelled by E; hence, it will move toward B, and the rod 3, by engaging in or with slot 2, will lock brake rod 1. If, when in that latter position, the commutating device 8, 9, be transferred, parallel to itself, so as to come into contact with commutator portions 11 and 12, and the switches 15 and 17 be again closed (in both instances for very short periods), the current in CD, with the connections as shown, will flow in an opposite direction, and CD will be repelled from B, thus releasing the brake rod 1. The manner in which this commutation is effected automatically, is shown in greater detail in Figs. 2 and 3, although in Fig. 2 the representation of the commutating device 8, 9, is diagrammatic and not intended to illustrate the mechanical operation. The commutating part of the switch consists of the guides 10 and 12, central portion 11, and movable element 22. The guides 10 and 12 consist each of the tips 21 made of an insulating material, and middle portion 10, of copper or other conducting material. When the part 22 is in contact with the commutator portion 21, no current can flow; this relation occurring when the master switch is either fully closed or fully open. During the period from closing to opening of the master switch, commutator portions 8 and 9 are in contact with either portions 10 and 11, or portions 12 and 11; corresponding, respectively, to the time when the switch 15 or 17 is closed. The portions 10 and 12 may be either straight or curved, the latter form being of advantage as it permits of a longer contact between portions 8, or 9, and 10, or 12, respectively.

The portion 11 may be of a conducting material entirely, or of a conductor partly and partly of an insulator; the only requirement being that the faces directed toward portions 10 and 12 are of a conducting material, and electrically connected with one another. Said portion 11 must further have such a shape with respect to commutator member 22 that the latter, when moving one way, will pass between portions 11 and 12, and when returning to its previous position, will pass between portions 11 and 12. This can be accomplished for example by giving portions 11 and 12, respectively, the shapes shown in Fig. 3, in which case they will invariably follow the path indicated by the arrowed lines. Each extreme end of the member 11 may be of spring like character, and inclined, respectively, in the direction of the channel of which it forms a terminal, to thereby provide a contracted channel portion which will expand to allow the outward passage of member 22; but which prevents the reëntrance of said member in the same channel on its return movement; instead, then serving as a guide to deflect said member 22 into the other channel.

Instead of the movable solenoid CD, the core alone may be movable, said core carrying or comprising the bolt, and being movable in opposite directions, to lock and unlock the brake, according to the direction of flow of the current in the solenoids.

In Fig. 4, I have illustrated, diagrammatically, means whereby the moving commutator element is normally free from conducting wires or other electrical connections, it only serving as a circuit closer when making passing contact with conductors of opposite polarity in the fixed portion of the commutator. For this purpose I employ spring brushes or contact members X, to be carried by a switch, and movable, together, respectively between fixed contact portions 10 and 8 and 9 and 11, when traveling in one direction, thereby passingly closing the circuit through the battery and solenoid for current flow in one direction; the brushes, in their reverse movement, being mechanically caused to take a different path, in which they make passing contact between the fixed commutator members 8, 11, and 9, 12, whereby the direction of current flow is reversed.

In Fig. 4 a single solenoid 24 is shown, having opposite windings 25, 26, forming circuits which respectively include the commutator portions 8, 10; 9, 11; and 8, 11; 9, 12. The solenoid has a movable core 27, which engages with brake arm 28, to lock the latter. To detain said core 27 at each end of its stroke, it has the recesses 29, to receive a releasably detaining spring 30, of effect corresponding with the like device described in my co-pending application, Serial No. 65858.

Variations may be resorted to within the spirit and scope of my said invention, and parts thereof used without others.

I claim:—

1. In an automobile having a brake, a lock member movable into and out of engagement with said brake when the latter is applied in service, electro-magnetic means to actuate said lock member, distributing circuits therefor, a commutator in said circuit having in and out paths of movement representing different directions of current flow, and a movable member to passingly close a circuit in each path.

2. In an automobile having a brake, a lock member movable into and out of engagement with said brake when the latter is applied in service, electro-magnetic means to actuate said lock member, distributing circuits therefor, a commutator in said circuits having in and out paths of movement representing different directions of current flow; a master switch, having among other functions, that of controlling said actuating means, and a movable member to passingly close a circuit in each path, to permit the flow of current in one direction as said switch is moved to its open circuit position, and to reverse the current as said switch is moved to its closed circuit position.

3. In an automobile having a brake, a lock member movable into and out of engagement with said brake when the latter is applied in service, electro-magnetic means to actuate said member in opposite directions, distributing circuits therefor, a commutator in said circuits having different forward and return paths of travel, representing different directions of current flow, each path including separated contacts, and a movable member to follow said paths and passingly bridge said contacts.

4. In an automobile having a brake, the combination of a lock member movable into and out of engagement with said brake when the latter is applied in service, a movable solenoid carrying said lock member, a stationary solenoid, a commutator having separated contacts included, respectively, in different paths of travel, in which, respectively, the direction of the current flowing through said solenoids is changed to alternately move said lock member into and out of engagement with said brake, a movable member to follow said paths and passingly bridge the separated contacts therein, a source of electrical energy, and distributing circuits including said solenoids, commutator, contacts and source of energy.

5. In an automobile having a brake, a lock member movable into and out of engagement with said brake when the latter is applied in service, solenoids for operating said lock member, a commutator to reverse the direction of the magnetic flux in said solenoids, said commutator comprising separate paths of movement, each including spaced contacts, and a pair of movable bridging members, to passingly close circuits with the spaced contacts in said paths.

Signed at the borough of Manhattan in the city, county and State of New York, this 24th day of March, A. D. 1916.

LEON GOLDMERSTEIN.

Witnesses:
W. E. FEE,
F. W. BARKER.